United States Patent [19]

Brennan

[11] 3,929,977

[45] Dec. 30, 1975

[54] METHOD FOR THE THERMAL CONVERSION OF AMMONIUM SULFATE TO AMMONIUM BISULFATE

[75] Inventor: Earl D. Brennan, Monroeville, Pa.

[73] Assignee: Koppers Company, Inc., Pittsburgh, Pa.

[22] Filed: Aug. 14, 1974

[21] Appl. No.: 497,299

Related U.S. Application Data

[63] Continuation of Ser. No. 294,230, Oct. 2, 1972, abandoned.

[52] U.S. Cl. ........................... 423/520; 423/356
[51] Int. Cl.$^2$ ........................................ C01C 1/24
[58] Field of Search ................ 423/520, 545, 356

[56] References Cited

UNITED STATES PATENTS

| | | | |
|---|---|---|---|
| 3,243,261 | 3/1966 | Deiters | 423/356 |
| 3,816,603 | 6/1974 | Welty | 423/520 |

*Primary Examiner*—Earl C. Thomas
*Attorney, Agent, or Firm*—Robert D. Yeager

[57] ABSTRACT

The method of the present invention for thermally converting ammonium sulfate to ammonium bisulfate includes fusing a mixture of ammonium sulfate and bisulfate with heat to form a molten salt mixture. The molten salt mixture is formed into a thin film which is contacted with hot inert sweep gases to convert the ammonium sulfate.

7 Claims, No Drawings

METHOD FOR THE THERMAL CONVERSION OF AMMONIUM SULFATE TO AMMONIUM BISULFATE

This is a continuation of application Ser. No. 294,230, filed Oct. 2, 1972, and now abandoned.

FIELD OF THE INVENTION

The present invention relates to a method for the thermal treatment of ammonium sulfate to produce ammonium bisulfate.

BACKGROUND OF THE INVENTION

Various methods for the thermal treatment of ammonium sulfate to obtain ammonia, ammonium bisulfate, sulfur dioxide, and the like are generally well known. Illustrative of these methods are U.S. Pat. Nos. 905,415, 1,065,566, 2,405,747, 2,899,277, 3,243,261, 3,282,646 and 3,674,427. These methods include, for example, heating commercial ammonium sulfate in a cylindrical retort with agitators to temperatures of approximately 350°C to 400°C to obtain ammonia and ammonium bisulfate byproducts; reclaiming high purity ammonia by utilizing aqueous ammonium bisulfate, than sulfuric acid, to absorb ammonia from coke oven gases to intermediately produce ammonium sulfate which is separated and decomposed to bisulfate for recycling and ammonia. Similar methods have been proposed for obtaining sulfur dioxide from thermal decomposition of ammonium sulfate or ammonium bisulfate by first heating and agitating a molten ammonium bisulfate and then passing a nonoxidizing gas into the ammonium bisulfate where there is a high gas-liquid surface interface. This interface is provided by converting the gas stream into finely divided bubbles which are passed vertically upward through the molten ammonium bisulfate or caused to follow a torturous or turbulent course in prolonged contact with the liquid or impingement of the gas stream onto or through static or dynamic thin film liquids.

While many methods have been proposed for the thermal conversion or treatment of ammonium sulfate and/or bisulfate, the general inefficiency of these methods has prevented them from obtaining commercial significance of practical utility. The need for an economical process for obtaining high conversion rates to ammonium bisulfate has been greatly enhanced by certain organic synthesis reactions which utilize ammonium bisulfate. In many of these reactions ammonium sulfate is produced as a byproduct. Accordingly, efficient regeneration of the ammonium bisulfate from the ammonium sulfate is desirable. Not only is it desirable to provide a method for efficient conversion, but the method should be capable of permitting varying quantities of ammonium bisulfate to pass through the process unchanged. It is preferable to permit any unreacted ammonium bisulfate to pass through the process rather than attempting to separate the salts for which no practical process presently exists.

SUMMARY OF THE INVENTION

The present invention is addressed to a method for the thermal conversion of ammonium sulfate to ammonium bisulfate in the presence of ammonium bisulfate. The method of the present invention provides for the thermal conversion of ammonium sulfate to ammonium bisulfate in which economical conversion rates are obtained with a minimum of undesired overdecomposition of the regenerative products.

The principal reaction of the present invention is $(NH_4)_2SO_4 \rightarrow NH_4HSO_4 + NH_3$. The reaction is well known and has been the basis of many of the aforementioned processes. It is also known that conversion conditions must be carefully controlled, particularly the temperature, because of the formation of pyrosulfate, which at elevated temperatures decomposes: $3(NH_4)_2S_2O_7 \rightarrow 2NH_3 + 6 SO_2 + 2 N_2 + 9 H_2O$. The generation of sulfur dioxide represents a loss to the system which is not desirable.

Generally, the method of the present invention comprises thermally fusing a mixture of ammonium sulfate and ammonium bisulfate to form a molten salt mixture. A thin film of the molten salt mixture is then formed and contacted with hot inert sweep gases to convert the ammonium sulfate within the mixture to ammonium bisulfate. The amount of ammonium bisulfate present in the mixture is preferably 50 percent or greater to facilitate thin film formation. More desirably, ammonium bisulfate comprises about 67 percent of the mixture. Since ammonium bisulfate is utilized as a carrier for the ammonium sulfate, which does not melt, the need for separating the salts, sometimes found together as byproducts, is eliminated.

More particularly, the method of the present invention provides heating a mixture of ammonium sulfate/ammonium bisulfate salts to about 270°–300°C to provide a clear flowable liquid. In the case of certain synthesis reactions, organics present are preferably eliminated from the mixture by methods known to those skilled in the art. Removal is particularly desirable where organics are present in sufficiently large quantities to provide troublesome foaming. After removal of the organics, the salt mixture is heated to the desired temperature during which time, any water present is split off or evaporated.

The molten salts are introduced into a thin film reactor and contacted with a sweep gas. The streams may be either co-current or countercurrent. A co-current stream may be advantageous where small amounts of organics present tend to foam; the co-current stream can continually sweep the reactor clean. Residence time within the reactor is preferably at least 20 minutes. The sweep gases, inert as to both salts and decomposition products, are introduced preferably at a temperature of about 350° to 550°C.

More particularly, it has been found that in order to permit the passage of ammonium bisulfate unchanged, to overcome the resistances to mass and heat transfer, and permit short-duration exposure of the salts to conversion temperatures, it is preferred that the molten salts be subjected to conversion conditions in apparatus which employ thin-film principles. Conversion of molten salts in a bulk manner provides unsatisfactorily low rates of conversion, since the temperature must be limited to prevent the aforementioned decomposition of the ammonium bisulfate. However, when the temperatures are raised in bulk systems to significantly increase the conversion rate, there is an accompanying excessive loss of salt through decomposition, namely conversion to sulfur dioxide. Thus, to achieve satisfactory commercial conversion rates, the salts are introduced into a reactor apparatus providing a thin-film of the liquid salt. Examples of apparatus suitable for use in the present invention include inclined falling-film apparatus, rotary kiln and/or wiped-film equipment (for mechanically-induced films), trickle-bed reactors or packed columns.

To supply the necessary heat for the thermal conversion of the ammonium sulfate to ammonium bisulfate, a hot sweep gas is utilized. Co-current as well as countercurrent flow patterns are suitable for use in the present invention. The hot sweep gases not only provide the necessary heat to carry out the endothermic conversion reaction, but they also serve to carry out ammonia and other decomposition products. Suitable sweep gases include for example, superheated steam, nitrogen, combustion gases and synthetic gases (73 percent by volume nitrogen; 10% by volume carbon dioxide and 17 percent by volume $H_2O$).

While it has generally been considered disadvantageous for economic reasons to utilize superheated steam in processes involving ammonium sulfate-bisulfate conversion, superheated steam is preferred in the present invention. Since ammonia is a byproduct of the conversion, its recovery is desirable. Thus, by recycling a part of the superheated steam the amount of heat energy input required to the system is reduced while at the same time the ammonia concentration is increased for more economical recovery. Accordingly, it is preferred to utilize superheated steam which is recycled to obtain a maximum concentration of 13 percent to 20 percent ammonia. Moreover, it has been found that the inclusion of water has been effective in eliminating or suppressing the formation of ammonium pyrosulfate which could result in the further decomposition of the pyrosulfate into sulfur dioxide. With the utilization of superheated steam, therefore, the complete elimination of the formation of pyrosulfate can be achieved. However, with a synthetic combustion gas (containing 17 percent by volume water) there was some formation of pyrosulfate, particularly during experimentation where extremely high conversion rates were attained.

The ratio of molten salt to sweep gas has been found not to be critical to the reaction. However, to provide economical heat transfer within efficient flow rate and temperature conditions, it is preferred that the ratio, by weight, be approximately one. Other ratios provide the desired results, but are somewhat less efficient particularly with respect to achieving the desired exit gas temperatures.

To achieve economical thermal conversion to ammonium bisulfate, the method of the present invention may be suitably carried out at atmospheric pressure. Preferably, the molten ammonium bisulfate-ammonium sulfate mixture is introduced into a trickle-bed reactor, packed with carbon or ceramic column packings of suitable size and shape, at a temperature of about 280°–300°C. The sweep gases are introduced into the reactor at a temperature of between 350° and 550°C. It is important to note, however, that the flow rates of the sweep gas in relation to the flow rates of the molten salts should be controlled so as to achieve an exit gas temperature not in excess of 330°C. Exit gases in excess of 330°C provide for excessive amounts of solid condensate to form in the vapor system as the gases are cooled upon leaving the reactor. This is found to occur regardless of the gas inlet temperature. It is believed that in the higher temperature zone at the bottom of the reactor, overdecomposition takes place, along with the desired reaction to produce ammonium bisulfate. The gaseous decomposition products are carried off with the sweep gases, only to recombine and form sublimate when the gas temperature is reduced outside the reactor. Since the formation of a sublimate poses operating problems which complicate the recovery of byproduct ammonia, it is therefore preferable to adjust the flow rates so that the exit temperature is not in excess of 330°C. Furthermore, if the temperature drop across the column is controlled to produce an exit gas temperature of between 300° and 320°C, the deposition of sublimate in the vapor system is easily eliminated. It is believed that although gaseous products of overdecomposition continue to be formed in the hot zone of the reactor, the recombination of these compounds occurs in the upper (cooler) section of the reactor. Sublimate is then carried back down the column with the incoming feed in a process analagous to reflux action in distillation.

DETAILED DESCRIPTION OF THE INVENTION

The following Examples are illustrative of the present invention:

Examples 1–18 were run with synthetic feed stock of 66.7% $NH_4HSO_4$ and 33.3% $(NH_4)_2SO_4$ in a 2-inch modified Vigreaux column. Superheated steam and synthetic combustion gases were used as the sweep gases. Both co-current and countercurrent flow patterns were used. The steam was introduced into the bottom of the column at a temperature of from 315°–400°C to contact the molten salt stream countercurrently. Electrical heating was utilized to control the temperature drop across the column. The exit gas was controlled at 285° to 310°C. The liquid/gas weight ratio was varied from 0.20 to 0.65 without significant effect upon the conversion.

With respect to the co-current flow patterns, steam inlet temperatures of 350°–400°C were utilized, and the exit gas was controlled at 300°C.

Examples 1–18 are summarized in Table I below.

TABLE I

| EXAMPLES | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Flow Pattern(1) | CNC | CNC | CNC | CNC | CNC | CNC | CNC | CNC | CNC | COC | COC | COC | COC | COC | COC | COC | COC | COC |
| Sweep Gas(2) | SHS | SHS | SHS | SHS | SHS | SHS | SHS | CG | CG | SHS | SHS | SHS | SHS | SHS | SHS | SHS | SHS | SHS |
| Temperatures,°C | | | | | | | | | | | | | | | | | | |
| Gas Inlet | 315 | 330 | 345 | 403 | 400 | 404 | 402 | 440 | 405 | 400 | 400 | 400 | 400 | 402 | 350 | 350 | 407 | 360 |
| Gas Outlet | 284 | 290 | 298 | 300 | 310 | 304 | 308 | 302 | 310 | 300 | 300 | 300 | 300 | 300 | 300 | 300 | 305 | 300 |
| Salt Feed | 240 | 246 | 248 | 275 | 283 | 281 | — | 323 | 302 | 275 | 265 | 265 | 275 | 275 | 265 | 280 | 250 | 262 |
| Run Duration, hr. | 1.8 | 2.0 | 2.0 | 3.0 | 2.5 | 2.0 | 2.0 | 3.0 | 3.0 | 4.0 | 2.0 | 2.0 | 4.0 | 3.0 | 3.0 | 3.0 | 2.0 | 2.0 |
| Feed Rates, lb./hr./ft.² | | | | | | | | | | | | | | | | | | |
| L, Salt | 9.7 | 12.5 | 10.6 | 17.9 | 9.3 | 13.2 | 30.1 | 9.3 | 9.0 | 9.0 | 9.4 | 13.0 | 13.2 | 18.6 | 18.9 | 34.4 | 25.6 | 24.6 |
| G, Gas | 46.7 | 45.0 | 43.1 | 31.7 | 37.4 | 45.6 | 46.2 | 26.0 | 36.1 | 22.5 | 37.6 | 39.2 | 29.2 | 28.6 | 25.7 | 27.8 | 29.6 | 45.3 |
| L/G | 0.21 | 0.28 | 0.25 | 0.57 | 0.25 | 0.29 | 0.65 | 0.36 | 0.25 | 0.40 | 0.25 | 0.33 | 0.45 | 0.65 | 0.74 | 1.24 | 0.87 | 0.54 |
| Product Salt Anal., | | | | | | | | | | | | | | | | | | |

TABLE I-continued

| EXAMPLES | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| %NH$_4$HSO$_4$ | 76.1 | 86.6 | 90.7 | 83.8 | 95.7 | 85.2 | 73.0 | 91.4 | 93.4 | 90.3 | 89.8 | 90.6 | 80.2 | 83.2 | 83.5 | 72.2 | 76.9 | 79.0 |

(1) CNC = countercurrent flow. COC = co-current flow.
(2) SHS = superheated steam. CG = synthetic combustion gas (72.5% N$_2$, 10.5% CO$_2$, 17% water, by vol.).

As can be seen, little difference exists between combustion gas and superheated steam as they relate to ammonium bisulfate regeneration. This was also true with respect to co-current and countercurrent flow patterns.

In Examples 19–27, salts recovered from an organic synthesis were converted by the method of the present invention utilizing a 2-inch modified Vigreaux column. The aqueous solution of feed salts was evaporated and melted in an inclined feed tube and then contacted with a countercurrent stream of superheated steam in the column. The column was occasionally clogged by foaming of the organics in the feed stock. By operating with the feed at a temperature of 300°C, rather than 250°–280°C, increased operating periods could be achieved by causing the foaming to occur in the feed tube.

Examples 19–27 are summarized in Table II below.

As can be seen from Table II, regenerated salts containing 92–96% NH$_4$HSO$_4$ were produced from feed salts containing 67% NH$_4$HSO$_4$ utilizing steam inlet temperatures of 360°–410°C and liquid/gas weight ratios of 0.2 to 0.4. In these examples, the vapors leaving the column were condensed, collected, and analyzed for ammonia. The condensate was found to contain 91 to 105 percent of theoretical ammonia based upon the conversion of (NH$_4$)$_2$SO$_4$.

Examples 28–41 were run utilizing 1 × 30 inch column packed with 1/4 inch carbon Raschig rings. A synthetic salt mix of 2:1 NH$_4$HSO$_4$/(NH$_4$)$_2$SO$_4$ feed was utilized. The results of these examples are set forth in Table III.

TABLE III

| EXAMPLES | 28 | 29 | 30 | 31 | 32 | 33 | 34 | 35 | 36 | 37 | 38 | 39 | 40 | 41 |
|---|---|---|---|---|---|---|---|---|---|---|---|---|---|---|
| Flow Pattern | CNC | CNC | CNC | CNC | CNC | CNC | CNC | CNC | CNC | CNC | CNC | CNC | CNC | CNC |
| Operating Medium | SHS | SHS | SHS | SHS | SHS | SHS | SHS | SHS | SHS | CG | CG | CG | CG | CG |
| Temperature, °C | | | | | | | | | | | | | | |
| Gas In | 350 | 400 | 450 | 452 | 400 | 402 | 400 | 405 | 405 | 398 | 402 | 450 | 403 | 406 |
| Gas Out | 300 | 305 | 300 | 300 | 300 | 304 | 298 | 335 | 305 | 300 | 300 | 299 | 300 | 304 |
| Salt Feed | 275 | 278 | 278 | 280 | 288 | 295 | 310 | 285 | 280 | 288 | 295 | 296 | 295 | 289 |
| Run Duration, hr. | 4 | 4 | 4 | 3 | 3 | 3 | 2.5 | 4 | 4 | 3 | 1.5 | 1.5 | 1.5 | 3 |
| Product Salt Anal., % NH$_4$HSO$_4$ | 87.5 | 88.1 | 93.9 | 97.2 | 89.8 | 79.2 | 77.6 | 90.6 | 85.5 | 86.6 | 77.6 | 82.5 | 78.9 | 83.9 |
| Flow Rates, lb./hr./ft.$^2$ | | | | | | | | | | | | | | |
| L, Salt | 35.6 | 38.6 | 31.4 | 24.9 | 44.4 | 63.7 | 80.0 | 22.1 | 35.9 | 32.6 | 119 | 68.1 | 75.2 | 34.2 |
| G, Gas | 89.2 | 87.3 | 85.2 | 96.9 | 94.7 | 62.4 | 92.3 | 26.3 | 36.6 | 31.2 | 85.5 | 125.0 | 50.3 | 68.3 |
| L/G | 0.40 | 0.44 | 0.37 | 0.26 | 0.47 | 1.02 | 0.87 | 0.84 | 0.98 | 1.04 | 1.39 | 0.55 | 0.50 | 0.50 |

Abbreviations:
CNC - Countercurrent Flow
COC - Co-current Flow
SHS - Superheated Steam
CG - Synthetic Combustion Gas (72.5 Vol.% N$_2$, 10.5 Vol.% CO$_2$, 17 Vol.% H$_2$O)

Examples 42–66 were run utilizing a column 60 inches in length and a synthetic combustion gas. The results are shown in Tables IV and V.

TABLE II

| EXAMPLES | 19 | 20 | 21 | 22 | 23 | 24 | 25 | 26 | 27 |
|---|---|---|---|---|---|---|---|---|---|
| Sweep Gas[1] | SHS | SHS | SHS | SHS | SHS | SHS | CG | SHS | SHS |
| Feed | 2 | 2 | 3 | 3 | 3 | 3 | 3 | 2 | 2 |
| Temperatures, °C | | | | | | | | | |
| Gas Inlet | 380 | 400 | 405 | 398 | 400 | 405 | 410 | 400 | 360 |
| Gas Outlet | 320 | 315 | 308 | 308 | 308 | 310 | 310 | 320 | 340 |
| Salt Feed | 315 | 315 | 280 | 285 | 295 | 290 | 296 | 300 | 310 |
| Run Duration, hr. | 3.0 | 3.0 | 2.0 | 3.0 | 3.0 | 2.0 | 3.0 | 2.0 | 3.0 |
| Feed Rate, lb./hr./ft.$^2$ | | | | | | | | | |
| L, Salt | 9.4 | 8.9 | 8.8 | 7.8 | 8.6 | 8.3 | 9.1 | 8.2 | 5.5 |
| G, Gas | 25.1 | 25.1 | 46.9 | 50.1 | 33.0 | 24.0 | 36.1 | 32.4 | 27.2 |
| L/G | 0.37 | 0.35 | 0.19 | 0.16 | 0.26 | 0.35 | 0.25 | 0.25 | 0.20 |
| Product Salt Anal., % NH$_4$HSO$_4$ | 92.1 | 96.5 | 91.9 | 93.4 | 92.3 | 97.9 | 93.0 | 91.9 | 92.7 |
| NH$_3$ Balance | | | | | | | | | |
| NH$_3$ Evolved, gm. (Theo.) | 8.9 | 9.6 | | | | | | 5.1 | |
| NH$_3$ in Condensate, gm. (By Anal.) | 8.6 | 8.7 | | | | | | 5.4 | |
| NH$_3$ Accountability, % | 97 | 91 | | | | | | 105 | |

[1] SHS = Superheated steam. CG = Synthetic combustion gas (72.5% N$_2$, 10.5% CO$_2$, 17% water, by vol.).
[2] Feed: Untreated organic synthesis liquors (first pass) containing 50% water and dissolved salts which contain 67.2% NH$_4$HSO$_4$.
[3] Feed: Organic synthesis liquors which have been treated to remove organics. Liquor contains 52% water and dissolved salts which contain 66.1% NH$_4$HSO$_4$.

TABLE IV

| EXAMPLES | 42 | 43 | 44 | 45 | 46 | 47 | 48 | 49 | 50 | 51 | 52 | 53 | 54 | 55 | 56 | 57 |
|---|---|---|---|---|---|---|---|---|---|---|---|---|---|---|---|---|
| Flow Pattern[1] | COC | COC | COC | COC | COC | COC | COC | COC | CNC | CNC | CNC | CNC | CNC | CNC | CNC | CNC |
| Feed Salt Ratio, $NH_4HSO_4/(NH_4)_2SO_4$ | 2 | 2 | 2 | 2 | 2 | 2 | 2 | 2 | 1.7 | 1.7 | 1.7 | 1.7 | 1.7 | 1.7 | 1.7 | 1.7 |
| Temperatures, °C | | | | | | | | | | | | | | | | |
| Salt Feed | 295 | 300 | 278 | 270 | 275 | 280 | 295 | 295 | 290 | 295 | 290 | 285 | 296 | 295 | 301 | 300 |
| Gas In | 455 | 450 | 500 | 500 | 400 | 405 | 405 | 450 | 450 | 450 | 446 | 451 | 445 | 462 | 453 | 453 |
| Gas Out | 300 | 300 | 303 | 298 | 300 | 295 | 300 | 300 | 302 | 310 | 322 | 313 | 321 | 315 | 306 | 302 |
| Run Duration, hr. | 14 | 7 | 3 | 2 | 3 | 3 | 3 | 3 | 3 | 2 | 1.5 | 1.5 | 1.5 | 1.5 | 1.5 | 1.5 |
| Product Salt Anal., % $NH_4HSO_4$ | 86.3 | 86.9 | 79.2 | 78.9 | 80.3 | 79.6 | 79.7 | 88.8 | 99.4 | 99.3 | 99.1 | 98.1 | 98.8 | 97.4 | 98.2 | 98.2 |
| Flow Rates, lb./hr./ft.$^2$ | | | | | | | | | | | | | | | | |
| L, Salt | 70.2 | 53.5 | 50.5 | 58.7 | 28.0 | 79.4 | 39.0 | 32.2 | 99 | 116 | 137 | 161 | 154 | 174 | 197 | 222 |
| G, Gas | 70.2 | 69.7 | 73.0 | 93.8 | 44.7 | 71.5 | 44.3 | 43.6 | 119 | 126 | 149 | 171 | 173 | 192 | 217 | 230 |
| L/G | 1.00 | 0.77 | 0.69 | 0.63 | 0.63 | 1.11 | 0.88 | 0.74 | 0.83 | 0.92 | 0.92 | 0.94 | 0.89 | 0.91 | 0.91 | 0.97 |

[1] COC signifies co-current flow; CNC is countercurrent flow.

TABLE V

| EXAMPLES | 58 | 59 | 60 | 61 | 62 | 63 | 64 | 65 | 66 |
|---|---|---|---|---|---|---|---|---|---|
| Flow Pattern[1] | CNC | CNC | CNC | CNC | CNC | CNC | CNC | CNC | CNC |
| Feed Salt Ratio, $NH_4HSO_4/(NH_4)_2SO_4$ | 1.7 | 1.7 | 1.7 | 1.7 | 1.7 | 1.7 | 1.7 | 1.7 | 1.7 |
| Temperatures, °C | | | | | | | | | |
| Salt Feed | 297 | 316 | 315 | 318 | 323 | 314 | 306 | 330 | 312 |
| Gas In | 450 | 450 | 460 | 457 | 460 | 454 | 448 | 451 | 450 |
| Gas Out | 345 | 339 | 341 | 327 | 327 | 322 | 318 | 322 | 340 |
| Run Duration, hr. | 1.5 | 1.5 | 1.5 | 1.5 | 1.5 | 1.5 | 1.5 | 0.5 | 9.5 |
| Product Salt Anal., % $NH_4HSO_4$ | 98.8 | 96.5 | 96.3 | 96.3 | 94.4 | 93.6 | 94.8 | 96.7 | 97.8 |
| Flow Rates, lb./hr./ft.$^2$ | | | | | | | | | |
| L. Salt | 191 | 230 | 259 | 285 | 314 | 339 | 318 | 400 | 279 |
| G, Gas | 220 | 260 | 270 | 305 | 318 | 342 | 354 | 379 | 305 |
| L/G | 0.87 | 0.89 | 0.96 | 0.94 | 0.99 | 0.99 | 0.90 | 1.05 | 0.92 |

[1] COC signifies co-current flow; CNC is countercurrent flow. Material Accountability 95.4% in Example 66

As can be seen, excellent results are achieved utilizing a countercurrent flowing synthetic combustion gas at inlet temperature of 450°C and a gas to liquid weight ratio of one. The results indicate that the conversion is controlled to a great degree by residence time.

EXAMPLE 67

Synthetic salts containing 50% $(NH_4)_2SO_4$ were fed to a 1 × 60 inch packed column and swept with a synthetic combustion gas at 450°C. A regenerated salt containing 93% $NH_4HSO_4$ was produced at gas and salt flow rates of 80 lbs./hr./ft.$^2$.

Examples 68 to 75 were run to determine the effect of recycling superheated steam for purposes of concentrating the ammonia byproduct as well as reducing the heat input to the process. Operation of the 1-inch by 60-inch trickle bed regenerator with recycle sweep gas was simulated by injecting ammonia into the superheated steam between the superheater and the column gas inlet. (Injection prior to the superheater apparently resulted in dissociation of the ammonia upon contact with the exposed electrical elements in the superheater). Synthetic salt feed was regenerated with a countercurrent flow of steam containing up to 20 weight percent ammonia. The results are presented in Table VI.

TABLE VI

| EXAMPLES | 68 | 69 | 70 | 71 | 72 | 73 | 74 | 75 |
|---|---|---|---|---|---|---|---|---|
| Temperatures, °C | | | | | | | | |
| Gas Inlet | 453 | 450 | 450 | 455 | 454 | 440 | 477 | 473 |
| Gas Outlet | 316 | 316 | 299 | 315 | 302 | 298 | 291 | 298 |
| Salt Feed | 285 | 280 | 311 | 340 | 322 | 322 | 325 | 320 |
| Run Duration, hr. | 2.0 | 1.2 | 1.5 | 1.5 | 1.5 | 1.5 | 1.0 | 1.0 |
| Column ΔP, in. W.C./ft. Packing | 0.36 | 0.50 | 0.56 | 0.86 | 0.80 | 0.80 | 0.90 | 1.00 |
| Flow Rates, lb./hr./ft.$^2$ | | | | | | | | |
| L, Salt | 81 | 78 | 102 | 100 | 176 | 198 | 199 | 184 |
| G, Gas | 112 | 102 | 155 | 141 | 208 | 196 | 234 | 231 |
| L/G | 0.72 | 0.76 | 0.66 | 0.71 | 0.85 | 1.00 | 0.85 | 0.80 |
| Ammonia in Sweep Gas Feed, Wt.% | 0 | 20.0 | 0 | 13.3 | 0 | 9.5 | 0 | 8.1 |
| Product Salt Anal., Wt.% $NH_4HSO_4$ | 99 | 80.0 | 100 | 94.9 | 100 | 94.6 | 100 | 96.8 |

Prior to each test with ammonia, the trickle bed was operated at steady conditions without added ammonia, to establish base points for reference. Two adverse effects resulted from ammonia injection: (1) plugging at the top of the column (the coolest point in the column) with frozen salt, indicating that the ammonia was reacting with the ammonium bisulfate in the feed thereby raising its melting point, and (2) a reduction in conversion of ammonium sulfate, reflecting the influence of the above reverse reaction and/or indicating that the presence of ammonia suppresses the desired decomposition reaction. The decrease in conversion and the problems arising from freezing salts in the column both decreased in severity as the concentration of ammonia in the sweep gas was reduced. At the 20 percent ammonia level, the ammonium bisulfate content in the regenerated salt was 80 percent, compared to 99 percent without ammonia. At an ammonia concentration of 13 percent, the product contained 95 percent $NH_4HSO_4$, and at 8 percent ammonia, the regenerated salt was 97% $NH_4HSO_4$.

What is claimed is:

1. A method for converting ammonium sulfate to ammonium bisulfate comprising:
    A. fusing a mixture of ammonium sulfate and ammonium bisulfate to form a molten salt mixture;
    B. continuously introducing said mixture into a thin-film reactor to form a continuous thin flowing film of molten salt;
    C. sweeping said thin flowing film of molten salt in said reactor with a hot inert gas selected from the group consisting of superheated steam, nitrogen, combustion gases and synthetic gases to convert said ammonium sulfate to ammonium bisulfate, and to sweep ammonia formed during said conversion from said reactor, said hot inert gas having a temperature after said sweeping not in excess of about 330°C.

2. The method as set forth in claim 1 wherein said mixture comprises from about 50 to 67 percent ammonium bisulfate.

3. The method as set forth in claim 1 wherein said fusion of said mixture of ammonium sulfate and ammonium bisulfate is conducted at about 270° to 300°C.

4. The method as set forth in claim 1 wherein said inert gas has an initial temperature of from about 350° to about 550°C., and including sweeping said thin flowing film of molten salts such that said inert gas has a temperature after said sweeping not in excess of about 330°C.

5. The method set forth in claim 4 wherein said thin film of molten salt is swept by the inert gas for a period not less than about twenty minutes.

6. The method as set forth in claim 1 wherein said hot inert gas is superheated steam, and including the step of recycling and superheated steam containing less than from about 13 to 20 percent ammonia.

7. The method as set forth in claim 1 wherein said thin flowing film of molten salt is swept with a hot inert gas in said reactor, and including the step of maintaining a temperature across said reactor to provide an exit gas temperature between about 300° and 320°C.

* * * * *

UNITED STATES PATENT OFFICE
CERTIFICATE OF CORRECTION

PATENT NO. : 3,929,977
DATED : December 30, 1975
INVENTOR(S) : Earl D. Brennan

It is certified that error appears in the above-identified patent and that said Letters Patent are hereby corrected as shown below:

Column 1, line 25, --rather-- should be inserted after "bisulfate,";

In Table III, Under the Column Headings Example 40, G, Gas, "50.3" is out of place and should read --150.3--;

Claim 6, line 3, "and" should read --any--.

Signed and Sealed this thirteenth Day of April 1976

[SEAL]

Attest:

RUTH C. MASON
Attesting Officer

C. MARSHALL DANN
Commissioner of Patents and Trademarks